(12) United States Patent
Tumback et al.

(10) Patent No.: US 7,128,037 B2
(45) Date of Patent: Oct. 31, 2006

(54) METHOD FOR STARTING AN INTERNAL COMBUSTION ENGINE OF A HYBRID DRIVE OF A MOTOR VEHICLE

(75) Inventors: Stefan Tumback, Stuttgart (DE); Dieter Hoetzer, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/470,522

(22) PCT Filed: Nov. 29, 2002

(86) PCT No.: PCT/DE02/04390

§ 371 (c)(1),
(2), (4) Date: Jan. 9, 2004

(87) PCT Pub. No.: WO03/049965

PCT Pub. Date: Jun. 19, 2003

(65) Prior Publication Data
US 2004/0112317 A1    Jun. 17, 2004

(30) Foreign Application Priority Data
Dec. 8, 2001    (DE) ................................ 101 60 481

(51) Int. Cl.
*F02N 17/00*    (2006.01)

(52) U.S. Cl. .............................. 123/179.3; 123/179.22; 123/179.28

(58) Field of Classification Search ............. 123/179.3, 123/179.28; 290/22, 31; 180/65.2
See application file for complete search history.

(56) References Cited

U.S. PATENT DOCUMENTS

| 5,698,905 A | 12/1997 | Ruthlein et al. |
| 5,934,395 A * | 8/1999 | Koide et al. ................ 180/65.2 |

FOREIGN PATENT DOCUMENTS

| EP | 0 930 193 | 7/1999 |
| EP | 1 020 640 | 7/2000 |
| JP | 9109706 | 4/1997 |
| JP | 11-336580 A * | 12/1999 |
| JP | 2000203287 | 7/2000 |
| WO | WO 2001-83249 | 11/2001 |

* cited by examiner

*Primary Examiner*—Andrew M. Dolinar
(74) *Attorney, Agent, or Firm*—Kenyon & Kenyon LLP

(57) ABSTRACT

A method for starting an internal combustion engine of a hybrid drive of a motor vehicle, the internal combustion engine and at least one electric motor being mechanically linkable to an output shaft of the hybrid drive via a gear system. The output shaft of the hybrid drive is placed in rotary motion, and at least one of the electric motors is switched to a generator mode by the gear system and by a control system.

6 Claims, 2 Drawing Sheets

METHOD FOR STARTING AN INTERNAL COMBUSTION ENGINE OF A HYBRID DRIVE OF A MOTOR VEHICLE

FIELD OF THE INVENTION

The present invention relates to a method of starting an internal combustion engine of a hybrid drive of a motor vehicle, the internal combustion engine and at least one electric motor being mechanically linkable to an output shaft of the hybrid drive via a gear system.

BACKGROUND INFORMATION

Hybrid drives are known. Hybrid drives have multiple drive sources that may be operated by a range of different energy sources.

For example, methods of combining an internal combustion engine with at least one electric motor are known. In this case, the crankshaft of the internal combustion engine and the drive shaft of the at least one electric motor are connected as input shafts to a gear system (shift mechanism). The internal combustion engine and/or the electric motor are mechanically linkable to an output shaft of the hybrid drive by operating the gear system. The output shaft is used in the known manner to drive a motor vehicle. In particular, hybrid systems that include more than one electric motor are also known.

In this case, in particular, motor vehicles having power branching hybrid drives are known, which, in addition to an internal combustion engine, include two electric motors that may be both motor-driven and generator-driven. Motor vehicles having hybrid drives of this type do not need to include a separate starting system for the internal combustion engine. The internal combustion engine may be started by the at least one electric motor of the hybrid drive by connecting the latter to an energy source, usually the motor vehicle battery. When the at least one electric motor is operating in motor mode, the internal combustion engine is started by shifting the gear system accordingly.

The disadvantage of the known hybrid drives is that the internal combustion engine does not start if the power supply for the at least one electric motor has failed.

SUMMARY OF THE INVENTION

The method according to the present invention has the advantage over the related art that the internal combustion engine may be started even if the supply voltage for the at least one electric motor of the hybrid drive has failed. By switching the at least one electric motor to generator mode, using the gear system of the hybrid drive, and placing the output shaft of the gear system in rotary motion, it is advantageously possible, even in the case of hybrid drives, to carry out auxiliary starting of the hybrid drive by applying an external kinetic energy to the motor vehicle. The external kinetic energy may be applied to the motor vehicle, for example by pushing, towing or rolling on an inclined plane or through similar means. Switching the at least one electric motor to generator mode establishes a mechanical link between the output shaft of the gear system and the crankshaft of the internal combustion engine. This makes it possible to transmit the kinetic energy from the output shaft to the crankshaft of the internal combustion engine, thus starting the latter.

According to a preferred embodiment of the present invention, one of the electric motors is switched to generator mode in the case of a hybrid drive having two electric motors, and the electrical energy supplied by this electric motor running in generator mode is used to operate the at least one further electric motor in motor mode. This enables the electric motor operating in motor mode to help start the internal combustion engine by applying an external kinetic energy to the motor vehicle, once the electric motor operating in generator mode has provided sufficient electrical energy.

According to a further preferred embodiment of the present invention, the at least one electric motor, in particular all the electric motors, of the hybrid system are first operated in idle mode and the electric motors are switched to generator mode or motor mode only after a presettable amount of external kinetic energy has been applied to the motor vehicle. For example, a rotational speed of the output shaft may be used as a criterion for this purpose. This makes it easier to apply a sufficient amount of kinetic energy to the motor vehicle, since it is not necessary to first overcome a resistance of the electric motors.

According to a further preferred embodiment of the present invention, the hybrid drive is started by first operating the electric motor in idle mode and, after applying a presettable amount of external kinetic energy to the motor vehicle, braking the electric motor through mechanical, pneumatic, hydraulic or other suitable means. Doing so directly mechanically couples the output shaft of the gear system to the crankshaft of the internal combustion engine, allowing the internal combustion engine to start.

DETAILED DESCRIPTION

Figure 1:
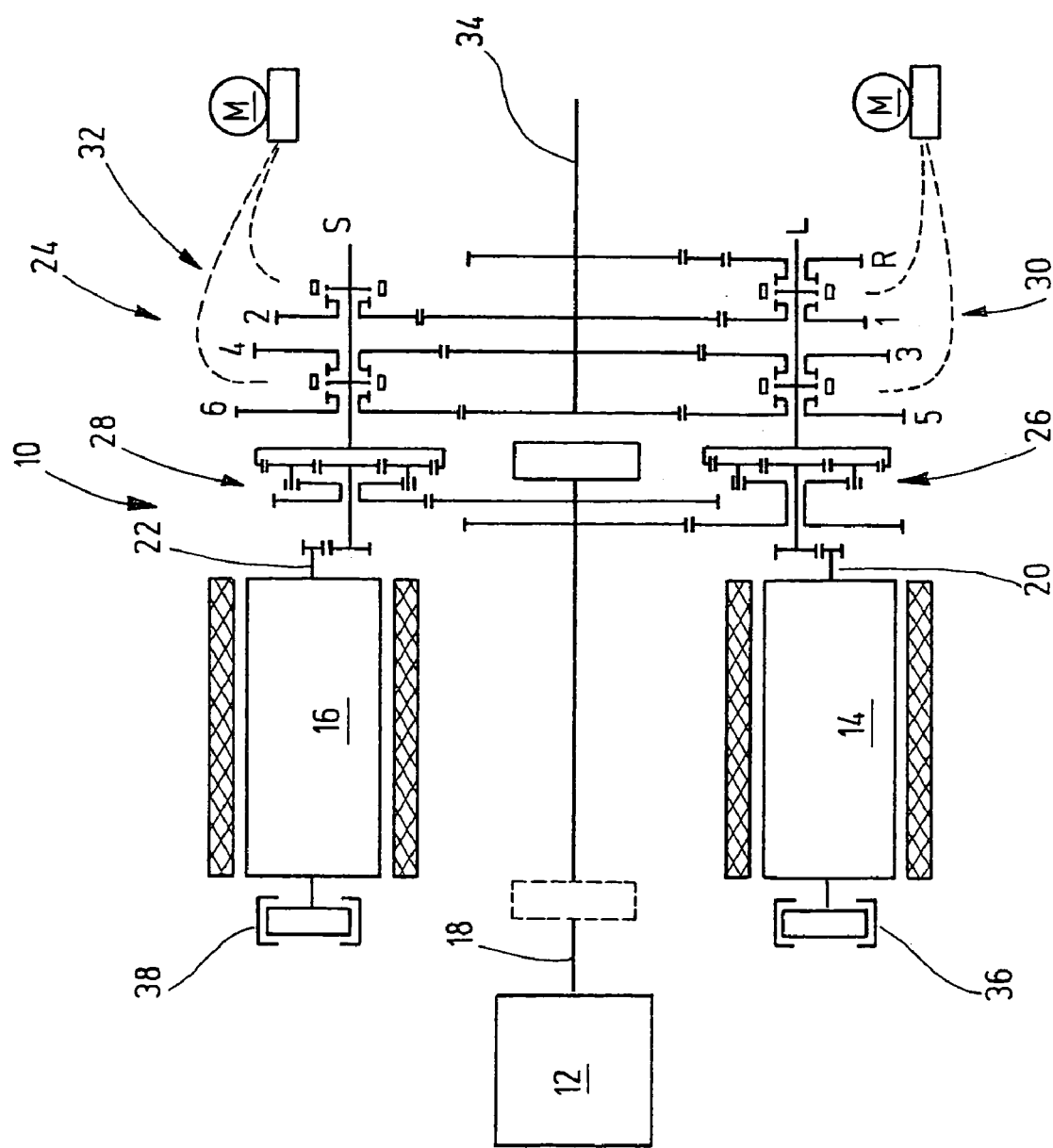
FIG. 1 shows a schematic view of a hybrid drive of a motor vehicle.

FIG. 1 shows a schematic representation of a motor vehicle hybrid drive that is identified as a whole by reference number 10. Hybrid drive 10 includes an internal combustion engine 12 as well as a first electric motor 14 and a second electric motor 16. A crankshaft 18 of internal combustion engine 12 and drive shafts 20 and 22, respectively, of electric motors 14 and 16 are mechanically linked to a gear system 24. In this case, drive shaft 20 is connected to a first planetary gear 26 and drive shaft 22 is connected to a second planetary gear 28. A ring gear of planetary gear 26 is connected to a shift mechanism 30, and a ring gear of planetary gear 28 is connected to a shift mechanism 32. Shift mechanisms 30 and 32, in turn, are mechanically linked to an output shaft 34 of gear system 24. Output shaft 34 is mechanically linked to a driving axle of the motor vehicle, which is not illustrated.

Because the design and function of a hybrid drive 10 of this type are generally known, they are not discussed in greater detail within the scope of the present description. In particular, internal combustion engine 12 and/or electric motors 14 and 16 are selectively actuatable to transmit a variable input torque from these components to output shaft 34. This makes it possible to set different operating modes of hybrid drive 10. By operating a switch in the known manner, shift mechanisms 30 and 32 allow different gears to be engaged, which are identified here as gears 1, 2, 3, 4, 5 and 6 as well as reverse gear R. Electric motors 14 and 16 may each be operated in generator mode and are used, for example, to provide a vehicle electrical system voltage of the motor vehicle and to charge a battery. To electric motors 14 and 16 are assigned brake units 36 and 38, respectively, which enable rotors of electric motors 14 and 16 to be mechanically braked.

During normal operation, internal combustion engine 12 of hybrid drive 10 is started in the known manner by operating at least one of electric motors 14 and 16 in motor mode. For this purpose, electric motor 14 and/or 16 is connected to a vehicle electrical system supply, usually a motor vehicle battery.

In the explanation below, it is assumed that it is not possible to start internal combustion engine 12 by operating it in a mode that is normal per se. This occurs, for example, when the motor vehicle battery responsible for the electric motors is flat or defective. In this situation, the electrical energy in the motor vehicle would not be available for starting internal combustion engine 12.

Below is an explanation of three embodiments according to which internal combustion engine 12 may be started without using the available electrical energy source. In all three embodiments, output shaft 34 of hybrid drive 10 is placed in rotary motion to start internal combustion engine 12. This may be done, for example, by pushing or towing the motor vehicle. By mechanically linking output shaft 34 to a drive system (drive wheels) of the motor vehicle, the motor vehicle motion is converted to a rotary motion of output shaft 34 when a kinetic energy is applied to the motor vehicle. It is also possible to have the motor vehicle roll on an inclined plane, for example a downhill road or similar surface.

According to the first embodiment, electric motors 14 and 16 are first switched to idle mode, i.e., they are not in motor mode or generator mode. Shift mechanisms 30 and 32 are placed in defined positions. This may be done, for example, by shifting shift mechanism 30 to reverse gear R and shift mechanism 32 to second gear 2. For this purpose, the countershafts of shift mechanisms 30 and 32 are placed in the appropriate positions. After drive shaft 34 is placed in rotary motion, electric motors 14 and 16 rotate in different directions, depending on the coupling between drive shafts 20 and 22 and gear system 24. Electric motor 16 is placed in generator mode, while electric motor 14 is placed in motor mode. Output shaft 34 is thus mechanically coupled to crankshaft 18 of internal combustion engine 12 via gear system 24 so that crankshaft 18 rotates simultaneously with the rotation of output shaft 34 and serves to start internal combustion engine 12 in a manner that is known per se. Because electric motor 16 is in generator mode, it supplies an electrical energy to the motor vehicle electrical system. Electric motor 14 may additionally use this electrical energy for motor mode so that the resulting input torque present at electric motor 14 may also be used to start internal combustion engine 12.

According to a second embodiment, electric motors 14 and 16 are first operated in idle mode. Defined gears are engaged in shift mechanisms 30 and 32. For example, the countershafts are used to engage shift mechanism 30 in first gear 1 and shift mechanism 32 in second gear 2. After a kinetic energy has been applied to the motor vehicle, i.e., while the latter is in motion and output shaft 34 is rotating, electric motors 14 and 16 are each placed in generator mode. Both electric motors 14 and 16 thus transmit a rectified torque to crankshaft 18 via gear system 24 so that the rotation of crankshaft 18 may be used to start internal combustion engine 12. By placing electric motors 14 and 16 in generator mode, it is possible to simultaneously supply electrical energy to the vehicle battery. As a result, electrical energy is simultaneously available once again for the vehicle electrical supply—in particular, if it is not possible to start the vehicle normally because the battery is empty.

According to a third embodiment, electric motors 14 and 16 are first switched to idle mode while output shaft 34 is rotating. Defined gears were engaged beforehand. After output shaft 34 has been placed in rotary motion, at least one of electric motors 14 or 16 is braked by activating brake unit 36 or 38. This couples output shaft 34 to crankshaft 18 directly via gear system 24. This direct coupling now enables internal combustion engine 12 to start.

The discussions above make it clear that different strategies may be employed to start internal combustion engine 12, the requirement being that output shaft 34 is always rotated by applying a kinetic energy to the motor vehicle. The decision as to which of the possible strategies is used in the end may be determined by a higher-level engine control unit of hybrid drive 10.

Figure 2:
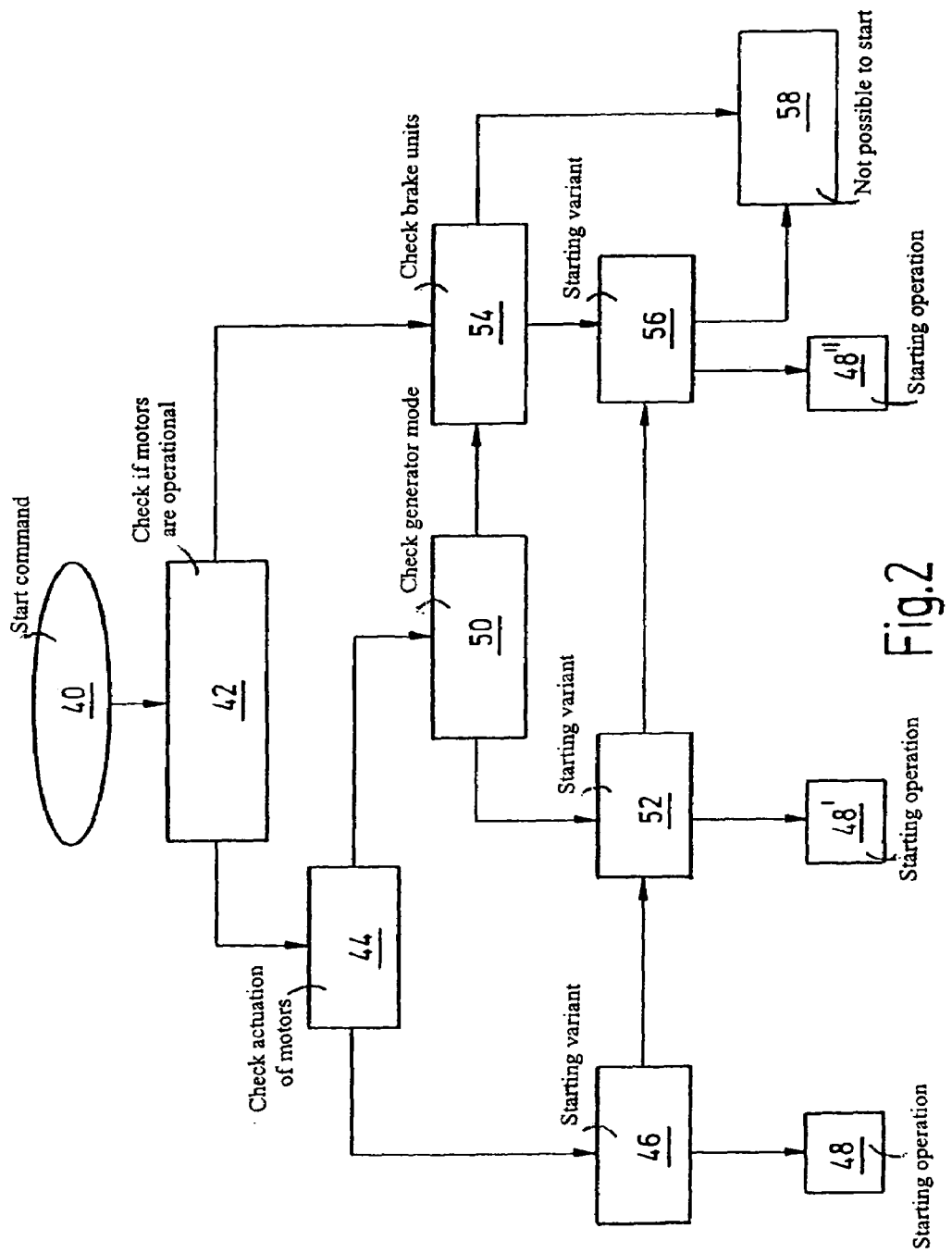
FIG. 2 shows a block diagram of different starting variants of the internal combustion engine of the hybrid drive.

FIG. 2 shows a block diagram illustrating the different ways in which the starting strategies for internal combustion engine 12 may be processed. After initiating a start command 40, a check is first carried out in step 42 to determine whether electric motors 14 and 16 are operational. If electric motors 14 and 16 are operational, a check is carried out in a subsequent step 44 to determine whether full actuation of electric motors 14 and 16 is possible. If so, internal combustion engine 12 may be started according to method variant 46 described first. This means that electric motor 14 is switched to generator mode and electric motor 16 to motor mode. Subsequently, starting 48 of internal combustion engine 12 takes place.

If query 44 reveals that, while electric motors 14 and 16 are operational, full actuation of electric motors 14 and 16 is not ensured, a check is carried out in a step 50 to determine whether electric motors 14 and 16 may be run at least in generator mode, if not in motor mode. If this is possible, internal combustion engine 12 is started 48' in a step 52 according to the second embodiment explained.

If query 42 reveals that electric motors 14 and 16 are not operational, and if query 50 shows that electric motors 14 and 16 may not be operated in generator mode, a check is carried out in a step 54 to determine whether brake units 36 and 38 of electric motors 14 and 16 are operational. If they are, third variant 48" for starting internal combustion engine 12 is initiated in a step 56. If query 54 reveals that brake units 36 and 38 are not operational, a decision 58 is made that it is not possible to start internal combustion engine 12 by pushing, towing or rolling on an inclined plane.

Variants 46, 52 and 56 for starting internal combustion engine 12 also build upon each other redundantly. If preceding queries 42 and 44 reveal that variant 46 for starting internal combustion engine 12 is possible per se, but internal combustion engine 12 does not start, the method may automatically go on to variant 52 and, if necessary, automatically to variant 56. If variant 56 is also unable to start internal combustion engine 12, decision 58 is made that it is not possible to start internal combustion engine 12.

On the whole, it is clear that, due to the branched decision hierarchy, internal combustion engine 12 of hybrid drive 10 may be easily emergency-started by applying a kinetic energy to the motor vehicle, for example if the vehicle electrical system voltage supply fails.

The present invention is, of course, not limited to the illustrated exemplary embodiment of a hybrid drive 10. Other types of hybrid drives 10, for example having more or fewer than two electric motors or using a different type of geared coupling between internal combustion engine 12 and electric motors 14 and 16, are also possible.

What is claimed is:

1. A method for starting an internal combustion engine of a hybrid drive of a standing motor vehicle in case of a failure of an electric power supply, the internal combustion engine and at least one electric motor being mechanically linkable to an output shaft of the hybrid drive via a gear system, the method comprising:

placing the output shaft of the hybrid drive in rotary motion;

switching at least one of the at least one electric motor to a generator mode by the gear system and by a control system, wherein each of the at least one electric motor of the hybrid drive is first operated in idle mode, and the at least one electric motor is switched to generator mode only after a presettable amount of external kinetic energy has been applied to the motor vehicle by one of pushing the vehicle, towing the vehicle, and pushing the vehicle down an inclined plane; and transmitting the kinetic energy from the output shaft to a crankshaft of the internal combustion engine, thereby cranking the internal combustion engine.

2. The method according to claim 1, further comprising using electrical energy supplied by the electric motor operating in generator mode to operate at least one second electric motor in motor mode.

3. The method according to claim 1, further comprising selecting one of generator mode and motor mode of the electric motor by operating a shift mechanism of the gear system.

4. A method for starting an internal combustion engine of a hybrid drive of a standing motor vehicle in case of a failure of electric power supply, the internal combustion engine and at least one electric motor being mechanically linkable to an output shaft of the hybrid drive via a gear system, the method comprising:

to start the internal combustion engine, first operating the at least one electric motor in idle mode and placing the output shaft in rotary motion by one of pushing the vehicle, towing the vehicle, and pushing the vehicle down an inclined plane;

subsequently braking the at least one electric motor in at least one of a mechanical, pneumatic and hydraulic manner; and transmitting the kinetic energy from the output shaft to a crankshaft of the internal combustion engine, thereby cranking the internal combustion engine.

5. The method according to claim 4, wherein the output shaft is placed in rotary motion by applying a kinetic energy to the motor vehicle.

6. The method according to claim 4, further comprising selecting one of a plurality of available method variants for starting the internal combustion engine by a control unit of the hybrid drive.

* * * * *